United States Patent [19]

Martens et al.

[11] Patent Number: 4,740,081
[45] Date of Patent: Apr. 26, 1988

[54] OPTICAL MEASURING APPARATUS

[75] Inventors: Gerhard Martens, Ellerau; Thomas Helzel, Hamburg, both of Fed. Rep. of Germany

[73] Assignee: U.S. Philips Corporation, New York, N.Y.

[21] Appl. No.: 841,127

[22] Filed: Mar. 18, 1986

[30] Foreign Application Priority Data

Mar. 23, 1985 [DE] Fed. Rep. of Germany ....... 3510704

[51] Int. Cl.$^4$ ................................................ G01B 9/02
[52] U.S. Cl. .................................... 356/345; 356/35.5; 356/43; 250/227
[58] Field of Search ................... 356/345, 359, 360, 32, 356/33, 35.5, 43, 44; 250/227

[56] References Cited

U.S. PATENT DOCUMENTS 3,925,727 12/1975 Duguay .............................. 250/227
4,025,195 5/1977 Ebersole et al. ................... 356/345

Primary Examiner—Davis L. Willis
Assistant Examiner—S. A. Turner
Attorney, Agent, or Firm—F. Brice Faller

[57] ABSTRACT

An optical sensor (1) is connected to an electro-optical transducer unit (35) and a measuring circuit (36) via an optical delay line (14) and an optical path (15). Error-free measurement values which are independent of the attenuation characteristics of the optical delay line (14) are obtained if the optical sensor (1) comprises a polarization splitter (3) which receives light pulses from the optical path (15) and from the optical delay line (14) and which is followed by a sensor body (2) which is traversed by the light pulses. A mirror (4) arranged on the side of the sensor body (2) on which the light is not incident reflects the light pulses back into the polarization splitter (3), which couples the light pulses back into the optical path (15) and the optical delay line (14).

8 Claims, 1 Drawing Sheet

OPTICAL MEASURING APPARATUS

BACKGROUND OF THE INVENTION

The invention relates to an optical measuring apparatus comprising an optical sensor which is connected to an optical coupler via an optical delay line and an optical path. The coupler is connected to an electro-optical transducer unit by a connecting fibre. The transducer unit supplies and receives light pulses and which supplies voltage pulses whose amplitudes correspond to the intensities of the received light pulses to a measuring circuit via at least one electrical line. The measuring circuit determines the physical quantity detected by the optical sensor from said amplitudes and transfers the result to a display.

An optical measuring apparatus of the type defined in the opening paragraph is disclosed in U.S. Pat. No. 4,293,118. The apparatus includes an optical pressure sensor, in which the freely movable parallel fibre ends of an optical delay line and of an optical path formed by an optical fibre terminate. A mirror is arranged opposite the fibre end faces, both the fibre end faces and the mirror surface being provided with opaque layers having identical grating structures. The movable fibre ends are mechanically connected to an elastic diaphragm, so that a pressure-dependent excursion of the diaphragm causes to move and hence the facing grating-structure layers are moved relative to each other, as a result of which the amount of light which is reflected back into the fibre ends by the mirror varies as a function of the pressure. The pressure exerted on the diaphragm can thus be determined by measuring the light intensity. The light is reflected back into the same fibre ends from which it issues, so that the light issuing from the fibre end of the optical delay line is also reflected back into the optical delay line and on account of the greater pathlength is subjected to a higher attenuation than the light propagating via the shorter optical path. Moreover, mechanical loads, variations in ambient temperature and changes in the transmission characteristics of the optical delay line as a result of aging result in additional attenuation-dependent measurement errors. Compensation for such errors requires the use of an intricate correction circuit which should allow for the instantaneous degree of attenuation of the light pulses passed through the optical delay line.

SUMMARY OF THE INVENTION

It is the object of the present invention to provide an optical measuring apparatus of simple construction, supplying error-free measurement values which are independent of the attentuation of an optical delay line.

To that end the optical sensor comprises a polarisation splitter which receives light pulses from the optical path and from the optical delay line and which polarises the light pulses linearly in such a way that the planes of polarisation of the light pulses issuing from the optical path and from the optical delay line extend perpendicularly to each other. The polarisation splitter is followed by a sensor body which is traversed by the polarised light pulses, which changes the state of polarisation of the light pulses depending on the physical quantity which acts on the sensor body, and which reflects the light pulses back to the polarisation splitter by means of a mirror arranged on that side of the sensor body which is remote from the side where the light is incident. The polarisation splitter extracts a first linearly polarised light component from each light pulse to couple this component into the optical delay line and extracts a second linearly polarised light component whose plane of polarisation extends perpendicularly to that of the first light component and couples it into the optical path.

From each of the light pulses supplied by the electro-optical transducer unit the optical sensor derives three light pulses which are returned to the electro-optical transducer unit. These pulses reach the electro-optical transducer unit delayed relative to each other by a time interval $\Delta t$ controllable by the length of the optical delay line. The second light pulse which is delayed relative to the first one by one time interval $\Delta t$ traverses the optical delay line once and the third light pulse which is delayed by twice the time interval $\Delta t$ traverses the delay line twice, so that measurement errors as a result of the attenuation of the light-pulse intensities in the optical delay line can be corrected in that computing means form the ratio between the amplitudes of the voltage pulses supplied by the electro-optical transducer unit, which amplitudes correspond to the intensities of the light pulses. Moreover, measurement errors as a result of attenuation of the light-pulse intensities in the connecting fibre and as a result of fluctuations in the intensity of the light emitted by the light source are corrected without the use of an additional correction circuit.

In order to enable a pressure, a differential pressure or a force which acts on the sensor body as a pressure to be measured, it is advantageous if the sensor body is made of a light-transmitting solid material and the piezooptical effect is utilised.

A magnetic field which influences the optical sensor can be measured if the sensor body is made of Yttrium-Iron garnet.

An electric field which influences the optical sensor can be measured if the sensor body is made of lithium-niobate.

If the sensor body is made of lithium-tantalate or crystalline quartz the optical sensor may be employed as a temperature sensor.

An optical sensor of simple and consequently cheap construction is obtained if the polarisation splitter is constructed as a polarisation splitter prism which is arranged opposite the mutually perpendicular longitudinal axes of the fibre ends of the optical delay line and of the optical fibre forming the optical path which fibre ends are connected to the optical sensor in such a way that the longitudinal axes of the fibre ends each extend perpendicularly to an exterior surface of the polarisation splitter prism, which comprises a splitting layer which is disposed parallel to the bisector of the longitudinal axes of the fibre ends and which reflect part of the light and transmits part of the light.

The operating point of the optical measuring apparatus can be adjusted by arranging an optical retardation plate, for example a $\lambda/8$-plate, between the polarisation splitter and the sensor body or between the sensor body and the mirror.

DETAILED DESCRIPTION OF THE PREFERRED EMBODIMENTS

Figure 1:
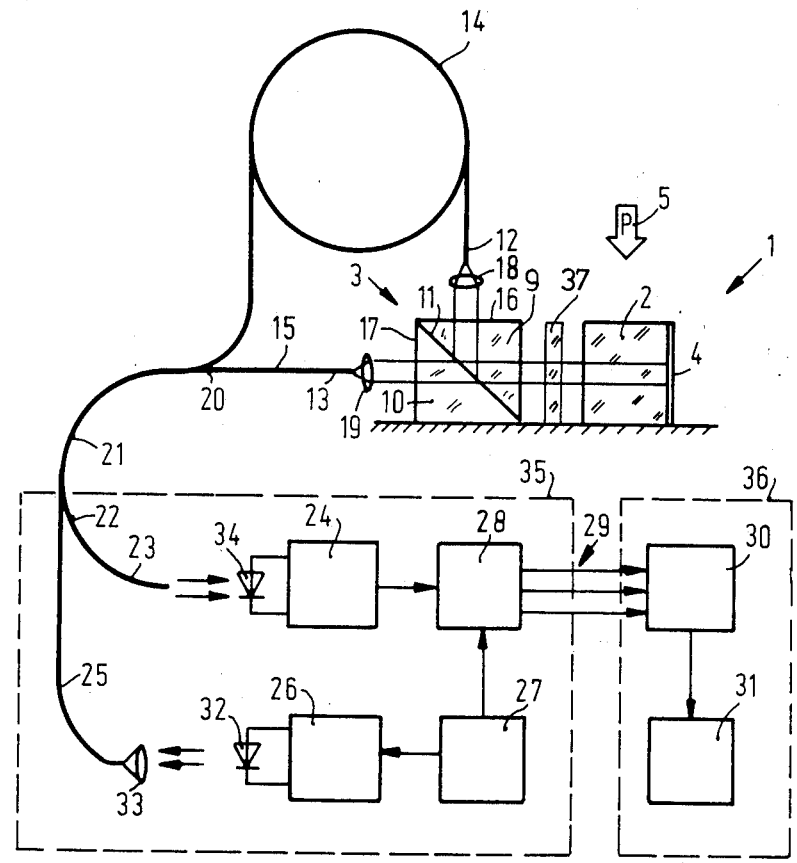
FIG. 1 shows an optical measuring apparatus comprising an optical sensor having a piezooptical sensor body.

The optical measuring apparatus comprises an optical sensor 1 which comprises a light-transmitting sensor body 2 and a polarisation splitter prism 3. An optical retardation plate 37, preferably a λ/8 plate, may be arranged between the sensor body 2 and the prism 3. Such a retardation plate may alternatively be arranged between the sensor body 2 and the mirror 4.

The sensor body 2 shown in the FIGURE is a piezooptical sensor body of a light-transmitting solid material, for example quartz glass, or a light-transmitting synthetic material. A mirror 4 is arranged on that side of the sensor body 2 which is remote from the polarisation splitter prism 3. A pressure P acts on the sensor body 2 in the direction indicated by the arrow 5 in such a way that the resulting principal stress axes in the area of the sensor body 2 which is traversed by the light make an angle of 45° with the plane of the drawing.

Alternatively the sensor body 2 may be made of yttrium-iron garnet, which changes the state of polarisation of light depending on a magnetic field which influences the sensor body 2, of lithium niobate, which changes the state of polarization of light depending on an electric field, or of lithium tantalate, which changes the state of polarisation of light depending of the temperature of the sensor body 2. Furthermore, the sensor body 2 may consist of crystalline quartz, which also changes the state of polarisation of light depending on the temperature.

The polarisation splitter prism 3 comprises two 90° flint-glass prisms which are cemented to each other with an interposed splitting layer 11. This layer for example reflects that component of the light incident on the prism 3 which is linearly polarised perpendicularly to the plane of the drawing and transmits the light component which is linearly polarised parallel to the plane of the drawing. The splitting layer 11 comprises a plurality of layers of a dielectric material, for example alternately zinc-sulphide and cyrolite.

The fibre ends 12 and 13 of an optical delay line 14 and an optical path 15 in the form of an optical fibre are aligned in such a way that their longitudinal axes extend perpendicularly to each other and each extend perpendicularly to an exterior surface 16 and 17 respectively of the polarisation splitter prism 3. The light issuing from the fibre end 12 perpendicularly incident on the surface 16 of the prism 3 via a lens 18 and the light issuing from the fibre end 13 is perpendicularly incident on the surface 17 of the prism 3 via the lens 19. The sensor body 2 is arranged in such a way that it is traversed both by the light issuing from the fibre end 12 and reflected by the layer 11 and by the light issuing from the fibre end 13 and transmitted by the layer 11. The mirror 4 reflects the light back onto the polarisation splitter prism 3 in such a way that the splitting layer 11 reflects light towards the end face of the fibre end 12 via the lens 18 and transmits light to the end face of the fibre end 13 by the lens 19.

The optical delay line 14 may be constructed as a coil former onto which several layers of glass fibre are wound. The optical delay line 14 and the optical fibre 15 forming the optical path are interconnected by an optical coupler 20, which in the present example is constructed as a fibre coupler. The optical coupler 20 may laternatively be constructed as a beam splitter comprising a semitransparent mirror, which reflects part of the light from a light source and couples it into the optical delay line and which transmits part of the light so that it is projected onto the prism 3 via the lens 19. An optical fibre for the optical path 15 is required only if the optical coupler 20 in the form of a beam splitter is arranged at a larger distance from the lens 19. The elements 1 to 20 may be arranged in a housing.

By means of a connecting fibre 21 of arbitrary length the optical coupler 20 is connected to the electrooptical transducer unit 35, which comprises a fibre-optic tapping 22 which is connected to the fibre 21 and which branches into a first light conductor 23 which is optically connected to a light detector 34 and into a second light conductor 25 which is optically connected to a light source 32. In the present example the fibre-optic tapping 22 is constructed as a fibre coupler.

The light source drive 26 is controlled by an electric pulse generator 27. The light detector circuit 24 is connected to a demultiplexer 28 which, by means of the voltage pulses supplied by the pulse generator 27, routes the voltage pulses which are serially supplied by the light detector 34 to three parallel output lines 29 to apply them to a computing means 30. The computing means 30 forms part of a measuring circuit 36 and may be, for example, a microcomputer, which determines the pressure P acting on the senor body 2 from the amplitudes $I_1$, $I_2$ and $I_3$ of three voltage pulses which are transferred simultaneously via three output lines 29 in conformity with the relationship $$P = K \cdot \arctan \sqrt{I_2/(2\sqrt{I_1 I_3})} + a$$

where $a = \pi/4$ if the retardation plate 37 is a λ/8 plate. Otherwise, a can be determined by means of the equation $a = 2\pi/n$ if the optical retardation plate 37 is a λ/n plate. K is a calibration constant which depends on the construction of the measuring apparatus.

The computer 30 can also compute the pressure P by means of the relationship $$P = L \arccos[(I_1 - I_2 \cdot 0.5 \sqrt{I_1/I_3})/CI_1 + I_2 \cdot 0.5 \sqrt{I_1/I_3}\,)] + b$$

where L is calibration constant which depends on the construction of the optical measuring apparatus and b is equal to $\pi/2$ if the retardation plate 37 is a λ/8 plate. If the optical retardation plate 37 is a λ/n plate $b = 4\pi/n$.

The measuring circuit 36 comprises a display device 31 which displays the pressure P calculated by the computing means 30. Further, the pressure value P may be applied to a computer, no shown, via a data bus, not shown, for further processing.

The light source 32 which is connected to the light source drive 26 emits light pulses in the rhythm of the pulse generator 27, which light pulses are coupled into the second light conductor 25 by a lens 33. The light source 32 may be, a light emitting diode or a laser diode. A light pulse traversed the second light conductor 25 and the connecting fibre 21 and is routed to the optical path 15 and the optical delay line 14 by the optical coupler 20. As a result of the longer signal path the pulse transmitted by the delay line 14 leaves the fibre end 12 with a delay of Δt in comparison with the light pulse which propagates via the optical path 15 and leaves the fibre end 13. Subsequently, the latter pulse reaches the polarisation splitter prism 3 via the lens 19, the layer 11 of this prism transmitting that part of the pulse which is linearly polarised parallel to the plane of the drawing to the sensor body 2 via the optical retardation plate 37.

The pulse which has been routed via the optical delay line 14 reaches the polarisation splitter prism 3 via the lens 18 with a delay $\Delta t$, the splitting layer 11 reflecting the part of the light which is linearly polarised perpendicularly to the plane of the drawing to the sensor body 2 via the optical retardation plate 37.

The pulse traversing the sensor body 2 and reflected back by the mirror 4 become elliptically polarised to a larger extent as the pressure acting on the piezooptical sensor body 2 increases. The optical retardation plate 37 ensurs that the pulses are already elliptically polarised if no pressure is exerted on the sensor body 2.

For example, if a small pressure P is exerted on the sensor body 2 the major axis of the polarisation ellipse of the non-delayed light pulse extends parallel to the plane of the drawing, whilst that of the light pulse which is delayed by $\Delta t$ in the optical delay line extends perpendicularly to the plane of the drawing. The splitting layer 11 transmits these parts of these two elliptically polarised pulses which are linearly polarised parallel to the plane of the drawing to couple these parts subsequently into the optical path 15 via the lens 19, and it reflects these parts of the two elliptically polarised pulses which are linearly polarised perpendicularly to the plane of the drawing to the lens 18 which couples these pulses into the optical delay line 14. These pulses reach the optical coupler 20 with a delay $\Delta t$ relative to the light pulses propagating via the optical path 15.

Thus, the optical coupler 20 receives a light pulse issuing from the optical path 15 and coupled back into the optical path 15, so that it is not delayed by the optical delay line 14. The intensity $I_1$ of this pulse decreases as the pressure P increases. Further, the optical coupler 20 receives two kinds of light pulses with a delay $\Delta t$ which the first kind of pulses issue from the optical path 15 and are coupled into the optical delay line 14 after passage through the optical sensor 1 and the second kind of light pulses issue from the delay line 14, and are coupled into the optical path 15 the intensities $I_2/2$ of the two kinds of pulses are proportional to the magnitude of the pressure P exerted on the sensor body 2.

Finally, the optical coupler 20 receives a light pulse which issues from the optical delay line 14 and is subsequently returned into this delay line 14, so that it has a delay 2. $\Delta t$. The intensity $I_3$ of this pulse decreases as the pressure P increases. Said three light pulses which are consecutively received by the optical coupler 20 are routed further to the light detector 34 via the connecting fibre 21, the fibre-optic tapping 22 and the first light conductor 23. The detector circuit converts the light pulses into three serial voltage pulses having amplitudes $I_1$, $I_2$ and $I_3$. The demultiplexer 28 applies the three voltage pulses to the computing means 30 via three output lines 29, which computing means determines the pressure exerted on the sensor body 2 from the voltage amplitudes and transfers the measurement result to a display device 31.

What is claimed is:

1. An optical measuring apparatus comprising an optical sensor which is connected to an optical coupler via an optical delay line and an optical path, which coupler is connected to an electro-optical transducer unit by a connecting fibre, which transducer unit supplies and receives light pulses and which supplies voltage pulses whose amplitudes correspond to the intensities of the received light pulses to a measuring circuit via at least one electrical line, which measuring circuit determines the physical quantity detected by the optical sensor from said amplitudes and transfers the result to a display, characterized in that the optical sensor comprises a polarisation splitter which receives light pulses from the optical path and from the optical delay line and which polarises the light pulses linearly in such a way that the planes of polarisation of the light pulses issuing from the optical path and from the optical delay line extend perpendicularly to each other, which polarisation splitter is followed by a sensor body which is traversed by the polarised light pulses, which changes the state of polarisation of the light pulses depending on the physical quantity which acts on the sensor body, and which reflects the light pulses back to the polarisation splitter by means of a mirror arranged on that side of the sensor body which is remote from the side where the light is incident, which polarisation splitter extracts a first linearly polarised light component from each light pulse to couple this component into the optical delay line and which extracts a second linearly polarised light component whose plane of polarisation extends perpendicularly to that of the first light component and couples it into the optical path.

2. An optical measuring apparatus as claimed in claim 1, characterized in that the optical sensor is constructed as a pressure sensor comprising a piezooptical sensor body of light-transmitting solid material.

3. An optical measuring apparatus as claimed in claim 1, characterized in that the optical sensor is constructed as a magnetic field sensor comprising a sensor body of yttriym-iron garnet.

4. An optical measuring apparatus as claimed in claim 1, characterized in that the optical sensor is constructed as an electric-field sensor comprising a sensor body of lithium-niobate.

5. An optical measuring apparatus as claimed in claim 1, characterized in that the optical sensor is constructed as a temperature sensor comprising a sensor body of lithium-tantalate or cyrstalline quartz.

6. An optical measuring apparatus as claimed in claim 1, characterized in that the polarisation splitter is constructed as a polarisation-splitter prism which is arranged opposite the mutually perpendicular lingitudinal axes of the fibre ends of the optical delay line and of the optical fibre forming the optical path which fibre ends are connected to the optical sensor in such a way that the longitudinal axes of the fibre ends each extend perpendicularly to an exterior surface of the polarisation-splitter prism, which comprises a splitting layer which is disposed parallel to the bisector of the longitudinal axes of the fibre ends and which reflects part of the light and transmits part of the light.

7. An optical measuring apparatus as claimed in claim 1, characterized in that an optical retardation plate is arranged between the polarisation splitter and the sensor body and/or between the sensor body and the mirror.

8. An optical measuring apparatus as claimed in claim 7, characterized in that the optical retardation plate is constructed as a $\lambda/8$ plate.

* * * * *